(12) United States Patent
Tamura et al.

(10) Patent No.: US 7,518,795 B2
(45) Date of Patent: Apr. 14, 2009

(54) FILTER MODULE, OPTICAL MODULE AND METHOD FOR FABRICATING THE SAME

(75) Inventors: Kenichi Tamura, Hitachi (JP); Ryuta Takahashi, Hitachi (JP)

(73) Assignee: Hitachi Cable, Ltd., Chiyoda-ku, Tokyo (JP)

( * ) Notice: Subject to any disclaimer, the term of this patent is extended or adjusted under 35 U.S.C. 154(b) by 22 days.

(21) Appl. No.: 11/593,642

(22) Filed: Nov. 7, 2006

(65) Prior Publication Data

US 2007/0103770 A1    May 10, 2007

(30) Foreign Application Priority Data

Nov. 9, 2005  (JP) .............................. 2005-324834
Sep. 13, 2006  (JP) .............................. 2006-248264

(51) Int. Cl.
    *G02B 27/00*    (2006.01)
(52) U.S. Cl. ........................ 359/577; 359/580; 359/589
(58) Field of Classification Search ................. 359/577, 359/580, 589, 590
    See application file for complete search history.

(56) References Cited

U.S. PATENT DOCUMENTS

2004/0228586 A1*  11/2004  Kuhara ........................ 385/92

FOREIGN PATENT DOCUMENTS

JP    2002-313140    10/2002

* cited by examiner

*Primary Examiner*—Joshua L Pritchett
(74) *Attorney, Agent, or Firm*—McGinn IP Law Group, PLLC (57) ABSTRACT

A filter module, has an excellent high temperature and high humidity resistance. The filter module includes an optical filter assembly including multilayer filters and transparent members that is dropped into a bore formed in a metallic base. An adhesive4 is injected into a space between an inner wall of the bore and side surfaces of the optical filter assembly such that the edges of bonding surfaces of the multilayer filters and the transparent members are completely covered.

22 Claims, 7 Drawing Sheets

FILTER MODULE, OPTICAL MODULE AND METHOD FOR FABRICATING THE SAME

The present application is based on Japanese patent application No. 2005-324834 filed on Nov. 9, 2005 and Japanese patent application No. 2006-248264 filed on Sep. 13, 2006, the entire contents of which are incorporated herein by reference.

BACKGROUND OF THE INVENTION

1. Field of the Invention

This invention relates to a filter module, an optical module and a method for fabricating the same, and more particularly, to a filter module in which an optical filter fixed to a metallic base is assembled and an optical module in which an optoelectronic device is mounted on the filter module, each having a high temperature and high humidity resistance, and a method for fabricating the same.

2. Description of the Related Art

An optical filter assembly comprises multilayer filters bonded to a plurality of multilayer optical glass layers.

Figure 4A:
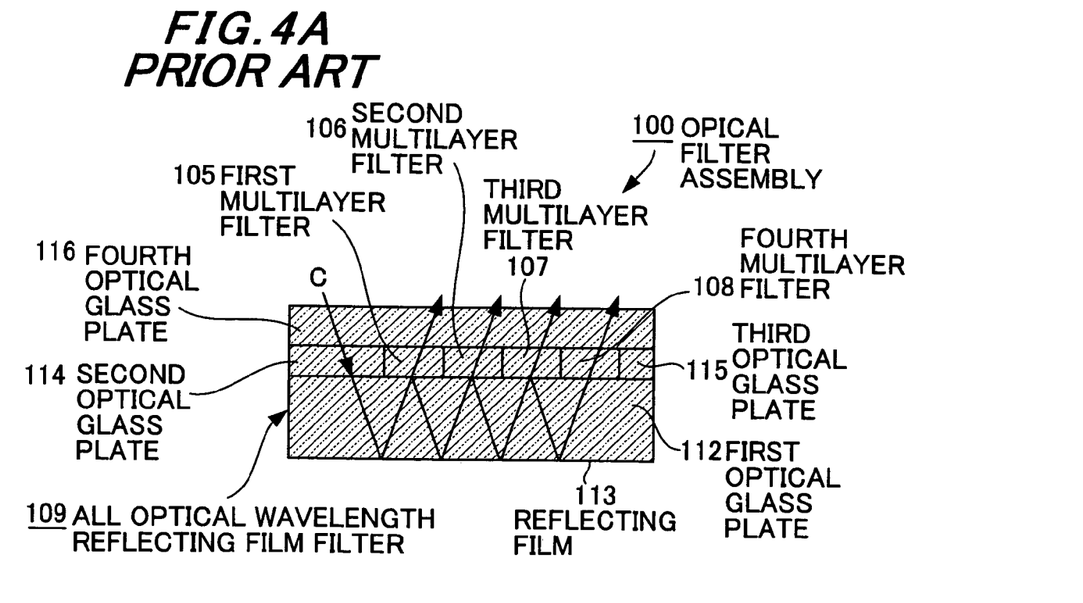
FIG. 4A is a schematic side view of the conventional optical filter assembly.

FIG. 4A is a schematic side view of a conventional optical filter assembly. The optical filter assembly 100 shown in FIG. 4A comprises a first multilayer filter 105, a second multilayer filter 106, a third multilayer filter 107, and a fourth multilayer filter 108 arranged in a single layer, and all optical wavelength reflecting film filter 109 opposed to the layer of the first to fourth multilayer filters 105 to 108. Herein, the first to fourth multilayer filters 105 to 108 are four kinds of the multilayer filters having different transmission wavelengths (or wavelength bands).

Figure 4B:
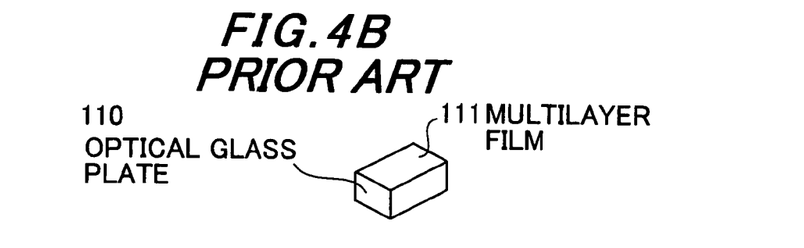
FIG. 4B is a schematic perspective view of a multilayer filter.

Herein, FIG. 4B is a schematic perspective view of a multilayer filter. Each of the first to fourth multilayer filters 105 to 108 is construed by forming a multilayer film 111 on one side of an optical glass plate 110 as shown in FIG. 4B.

In addition, the all optical wavelength reflecting film filter 109 is formed by providing a reflecting film 113 on one side of a first optical glass plate 112. On an extended line of the first to fourth multilayer filters 105 to 108 arranged in the single layer, second and third optical glass plates 114, 115 that having no special optical characteristic with respect to the optical wavelength are disposed. In concrete, the first to fourth multilayer filters 105 to 108 are sandwiched between the second and third optical glass plates 114 and 115. Further, another side of the first to fourth multilayer filters 105 to 108 arranged in the single layer is covered with a fourth optical glass plate 116. Namely, the single layer of the first to fourth multilayer filters 105 to 108 is covered with the all optical wavelength reflecting film filter 109 at its one side and covered with the fourth optical glass plate 116 at its opposite side.

In addition, an adhesive is used for bonding the respective optical glass plates each other. Of course, the adhesive is transparent with respect to the optical wavelengths.

In the optical filter assembly 100, when an optical wavelength multiplexed signal C (hereinafter referred as "light C") is incident to a predetermined point of the fourth optical glass plate 116 with a predetermined incident angle as shown in FIG. 4A, the light C is transmitted through the fourth optical glass plate 116 and the second optical glass plate 114 and reflected back at the reflecting film 113 of the all optical wavelength reflecting film optical filter 109. The reflected light (i.e. a first reflected light) is incident on the first multilayer filter 105, then only a light having a specific transmission wavelength is transmitted through the first multilayer filter 105, and a light having other wavelength is reflected back at the multilayer film of the first multilayer filter 105. The reflected light (i.e. a second reflected light) is reflected back at a point which is advanced with respect to the reflecting point of the reflecting film 113 of the all optical wavelength reflecting film optical filter 109. When the reflected light (i.e. a third reflected light) is incident on the second multilayer filter 106, only a light having a specific transmission wavelength is transmitted through the second multilayer filter 106, and the light having other wavelength is reflected back at the multilayer film of the second multilayer filter 106.

As described above, the lights having different wavelengths are sequentially transmitted in the selective manner. Therefore, the optical wavelength multiplexed signal is divided into optical signals having optical wavelengths (or wavelength bands) different from each other. Further, if the optical signals having the optical wavelengths different from each other are incident to the optical filter assembly 100 in a reverse optical path, the optical signals having different optical wavelengths are multiplexed to provide an optical wavelength multiplexed signal. In other words, this optical filter assembly 100 may be used as an optical multiplexer-demultiplexer.

For example, Japanese Patent Laid-Open No. 2002-313140 (JP-A-2002-313140) discloses a conventional type transparent conductive film, optical filter and its manufacturing method.

In general, when optical components made of glass are incorporated in an optical communication apparatus such as optical transceiver, spectroscopic analyzer or other optical apparatuses, the glass made portion is not directly fixed to a housing of the optical apparatus. Normally, the optical component is previously fixed to a stay member to provide an optical assembly then the optical assembly is installed in the housing of the optical apparatus, thereby facilitating the assembling of the optical apparatus. Herein, it is easy and simple to use the adhesive to fix the optical components to the stay member of the housing.

However, according to a configuration in which the optical filter assembly is fixed by the adhesive to the stay member of the housing, there is a disadvantage in that the adhesive may be broken away in case where the optical apparatus is exposed to a high temperature and high humidity environment for a long time.

In the optical filter assembly per se, the adhesive used for bonding the respective optical glass plates may be exfoliated (i.e. broken away) under the above circumstances. If the moisture or air bubbles intrude into a bonding surface of the optical glass plate or a space between the bonding surface of the optical glass plate and the multilayer filter in accordance with the exfoliation (break away) of the adhesive, the optical characteristics of the optical multiplexer-demultiplexer will be fluctuated.

Figure 5:
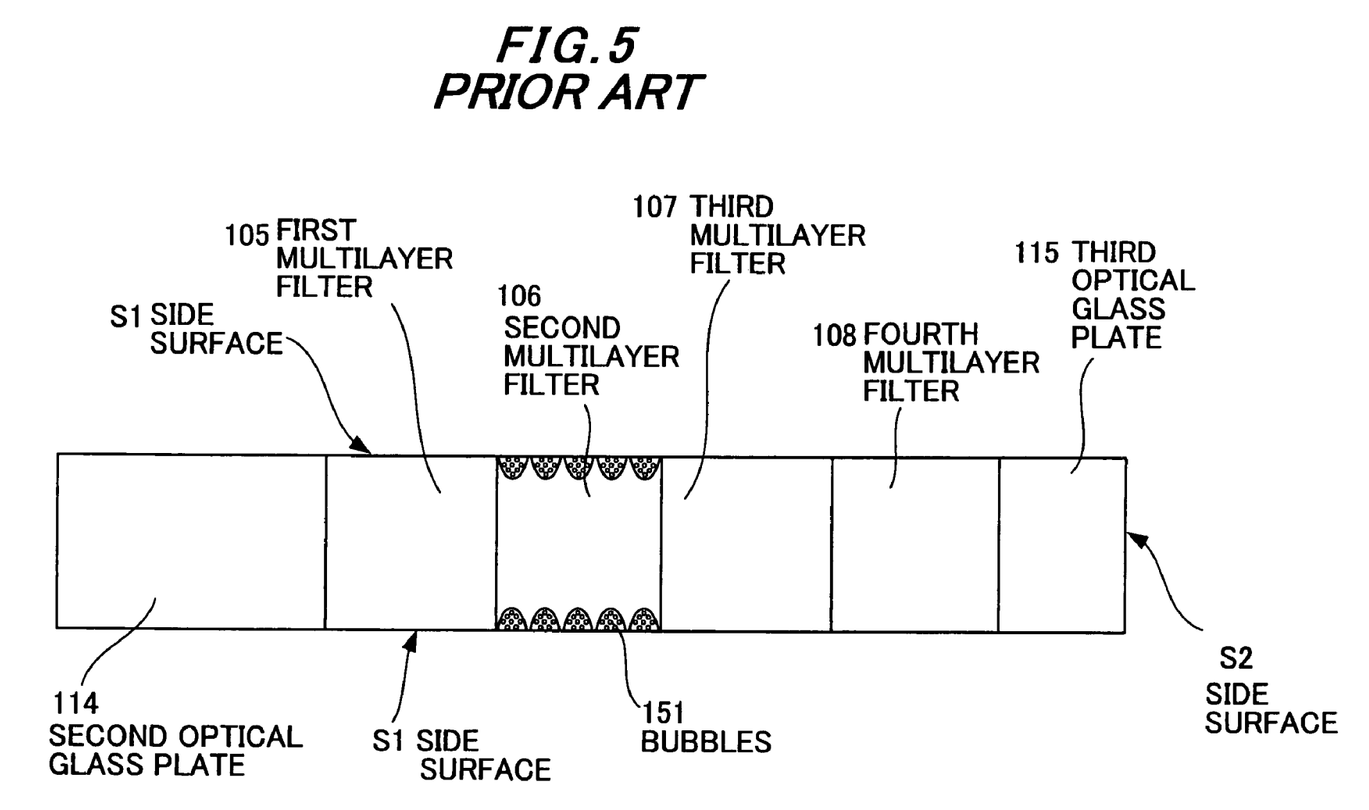
FIG. 5 is a schematic plan view of a part of the optical filter assembly in a deteriorated state.

FIG. 5 is a schematic plan view of a part of the optical filter assembly 100 in a deteriorated state when viewed through an upper surface.

As shown in FIG. 5, when a single piece of the optical filter assembly 100 is observed after conducting the high temperature and high humidity test, it can be confirmed that bubbles 151 are intruded into the bonding surfaces between the first optical glass plate 112 and the second multilayer filter 106, and the fourth optical glass plate 116 and the second multilayer filter 106, respectively. Since the bubbles 151 are concentrated along side surfaces S1 that are contacting the edges of the bonding surfaces, it is presumed that the bubbles 51 are intruded from the side surfaces S1 into the bonding surfaces.

SUMMARY OF THE INVENTION

Accordingly, it is an object of the invention to solve the above problems and to provide a filter module and an optical module with the high temperature and high humidity resistance, and method for fabricating the same.

According to a first aspect of the invention, a filter module comprises:

an optical filter assembly including a multilayer filter bonded to a transparent member at a bonding surface; and a metallic base including a bore for receiving the optical filter assembly; and an adhesive that fills a gap between the bore and the optical filter assembly and covers edges of the bonding surface completely.

In the filter module, the metallic base may further include a through-hole that passes through the metallic base.

In the filter module, the adhesive may fill a space between an inner wall of the bore and side surfaces of the optical filter assembly.

In the filter module, the through-hole may pass from a bottom of the bore to a back surface of the metallic base.

In the filter module, the adhesive may be provided in the through-hole.

In the filter module, the adhesive may cover an exposed part of a bottom surface of the optical filter assembly.

In the filter module, the adhesive may fill a gap between a bottom surface of the optical filter assembly and the metallic base.

In the filter module, it is preferable that a curvature of a liquid level of the adhesive at the gap between the bore and the optical filter assembly is greater than that of the adhesive provided in the through-hole.

In the filter module, it is preferable that b>c is established, where b is a periphery length of the bore and c is a periphery length of the through-hole.

In the filter module, it is preferable that M<N is established, wherein M is an area of the gap between the bore and the optical filter assembly and N is an area of the through-hole.

According to a second aspect of the invention, an optical module may comprise:

a filter module comprising:

an optical filter assembly including a multilayer filter bonded to a transparent member at a bonding surface; and a metallic base including a bore for receiving the optical filter assembly; and an adhesive that fills a gap between the bore and the optical filter assembly and covers edges of the bonding surface completely; and a CAN module including a photoelectric element disposed along an incident and emitted light axis of the optical filter assembly, the CAN module being fixed to the filter module.

According to a third aspect of the invention, a method of fabricating a filter module may comprise the steps of:

bonding a multilayer filter to a transparent member to provide an optical filter assembly;

dropping the optical filter assembly into a bore formed at a metallic base; and filling an adhesive into a gap between the bore and the optical filter assembly to cover edges of a bonding surface between the multilayer filter and the transparent member completely.

In the method of fabricating a filter module, the adhesive may be injected through the through-hole.

In the method of fabricating a filter module, the adhesive may be injected through the gap between the bore and the optical filter assembly.

According to the present invention, the high temperature and high humidity resistance can be enhanced.

BRIEF DESCRIPTION OF THE DRAWINGS

The preferred embodiments according to the invention will be explained below referring to the drawings, wherein:

FIGS. 1A and 1B are diagrams showing a filter module in a first preferred embodiment according to the invention, wherein

FIGS. 2A and 2B are diagrams showing a filter module in a second preferred embodiment according to the invention, wherein

FIGS. 4A and 4B are diagrams showing a conventional optical filter assembly, wherein

FIGS. 6A and 6B are diagrams showing an optical module in a fourth preferred embodiment according to the invention, wherein FIG. 6B is a cross sectional view thereof cut along A-A line in FIG. 6A, FIGS. 7A to 7C are diagrams showing a method for injecting an adhesive in the invention, wherein

DETAILED DESCRIPTION OF THE PREFERRED EMBODIMENTS

Figure 1A:
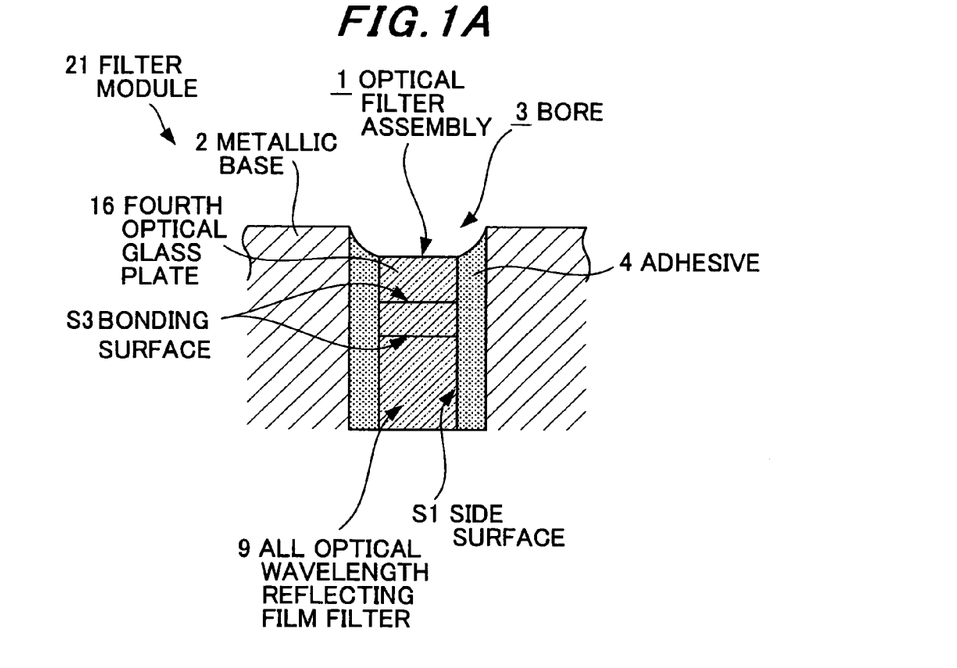
FIG. 1A is a partial cross sectional view thereof cut along a widthwise direction.
Figure 1B:
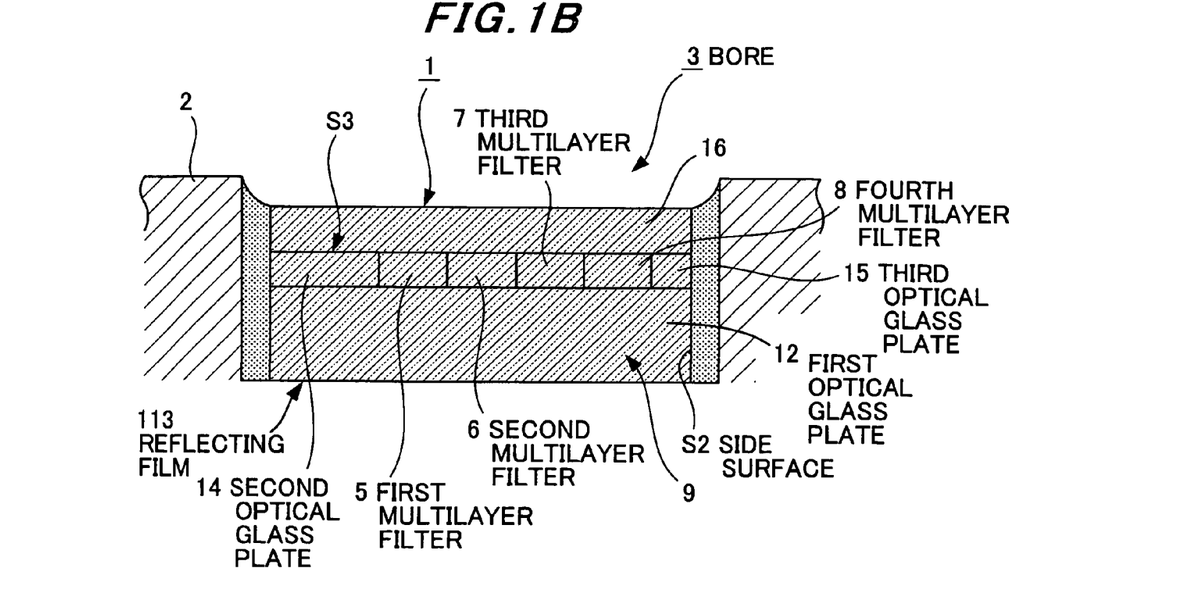
FIG. 1B is a partial cross sectional view there of cut along a longitudinal direction.

Preferred embodiment according to this invention will be explained in more detail in conjunction with the appended drawings, FIGS. 1A and 1B are diagrams showing a filter module in a first preferred embodiment according to the invention, wherein FIG. 1A is a partial cross sectional view thereof cut along a widthwise direction, and FIG. 1B is a partial cross sectional view there of cut along a longitudinal direction.

As shown in FIG. 1A, in the first preferred embodiment according to the invention, a filter module 21 comprises an optical filter assembly 1 including multilayer filters bonded to transparent members, a metallic base 2 including a bore 3 for receiving the optical filter assembly 1, in which a space between an inner wall of the bore 3 and side surfaces S1 of the optical filter assembly 1 is filled with an adhesive 4 so as to completely cover edges of bonding surfaces of the multilayer filters and the transparent members.

So as to compare with a partial cross section of the optical filter assembly 100 shown in FIG. 4A, FIG. 1B shows a partial cross sectional view of the optical filter assembly 1 of the filter module 21. In the filter module 21, the optical filter assembly 1 is dropped into the bore 3 formed in the metallic base 2, and the adhesive 4 is injected into a gap between the bore 3 and the optical filter assembly 1 so as to completely cover the edges of the bonding surfaces of the multilayer filters and the transparent members. Herein, the bore 3 may be called as a "drop-in bore", since the optical filter assembly 1 is dropped into the bore 3.

Similarly to the conventional optical filter assembly 100 explained in conjunction with FIGS. 4A and 4B, in the optical filter assembly 1, a second optical glass plate (transparent member) 14, first to fourth multilayer filters 5 to 8, and a third optical glass plate (transparent member) 15 are arranged in a single layer on an upper surface of a first optical glass plate (transparent member) 12, in which a reflecting film 13 is formed on a lower surface, and a fourth optical glass plate (transparent member) 16 is piled on and bonded to the second optical glass plate 14, the first to fourth multilayer filters 5 to 8, and the third optical glass plate 15 arranged in the single layer by using the adhesive. The optical filter assembly 1 has a rectangular solid-shaped appearance. The transparent member 15 is an optical member through which the light C can be transmitted with low loss at least in an optical wavelength band used for the optical communication. For example, optical glass, acrylic resin, or polymeric material can be used as the transparent member 15. In particular, since a quartz glass has the low loss characteristics and little alteration in the optical characteristics due to the temperature alteration compared with the other optical glasses, it is effective to use the quartz glass to obtain the excellent characteristics. Similarly to FIG. 5, the first to fourth multilayer filters 5 to B arranged in the single layer has the side surfaces S1 along the longitudinal direction, and side surfaces S2 at both ends along the widthwise direction. The illustration thereof is omitted since the essential configuration is similar to the configuration shown in FIG. 5 except the generation of the bubbles 151.

The adhesive for bonding respective bonding surfaces S3 in the optical filter assembly 1 is same as the adhesive 4 used for bonding the optical filter assembly 1 to the metallic base 2. For example, the UV-curing resin may be used.

In the filter module 21 according to the present invention shown in FIG. 1A, the side surfaces S1 are covered with the adhesive 4. The adhesive 4 almost fills the gap up to a top surface of the optical filter assembly 1 (up to the transparent member 16 which is the uppermost layer). It is inevitable that the moisture or the bubbles will intrude into the adhesive 4, if the adhesive 4 is disposed in the high temperature and high humidity for a long time. However, according to the present invention, the side surfaces S1 (the edges of the bonding surfaces S3) that may cause a controversial effect on the optical characteristics are covered with the adhesive 4. Further, the adhesive 4 is exposed to the outside only at a gap between the upper portion of the transparent member 16 and the metallic base 2. Accordingly, an exposed area of the adhesive 4 that may provide an access for the moisture and the air bubbles is small, and a distance from the access to side surfaces S1 (the edges of the bonding surfaces S3) is long. Therefore, it is possible to significantly postpone the time that the moisture and the bubbles would intrude into the bonding surfaces S3 of the first to fourth multilayer filters 5 to 8.

Figure 2A:
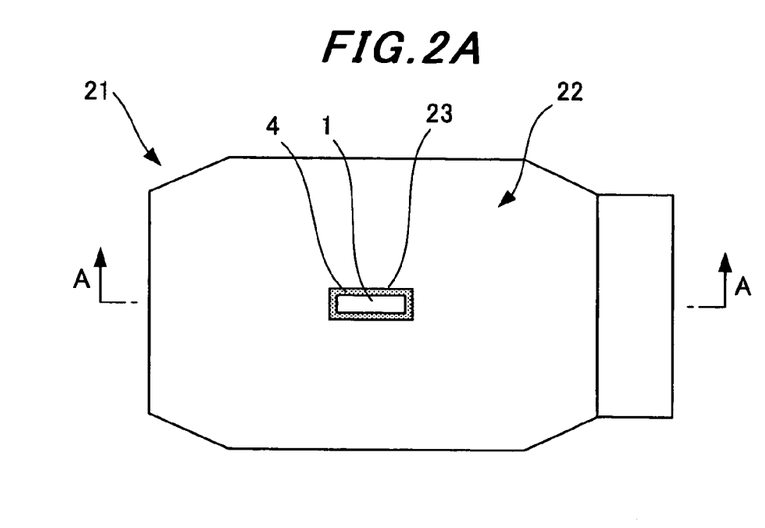
FIG. 2A is a plan view thereof.
Figure 2B:
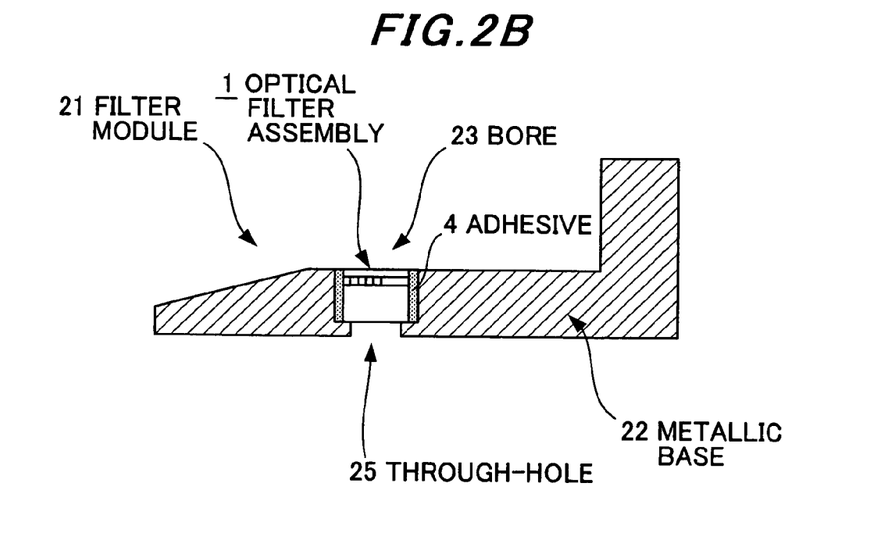
FIG. 2B is a cross sectional view thereof cut along A-A line in FIG. 2A.

FIGS. 2A and 2B are diagrams showing a filter module in the second preferred embodiment according to the invention, wherein FIG. 2A is a plan view thereof, and FIG. 2B is a cross sectional view thereof cut along A-A line in FIG. 2A.

The filter module according to the present invention may be incorporated in, for example, a higher-level device such as an optical transceiver. For the application to the higher-level device, the metallic base 2 is formed to have a required shape. For example, as shown in FIGS. 2A and 2B, the filter module 21 is construed by dropping the optical fiber assembly 1 into a bore (drop-in bore) 23 formed at a metallic base 22, and filling an adhesive 4 into a space between an inner surface of the bore 23 and side surfaces of the optical filter assembly 1.

In the second preferred embodiment, a depth of the bore 23 is substantially equal to a height of the multilayered optical filter assembly 1 as shown in FIG. 2B.

In addition, the metallic base 22 is provided with a through-hole 25 which passes through the metallic base 22, namely from a bottom of the bore 23 to a back surface of the metallic base 22. Either one or both of a width (along a vertical direction in FIG. 2A) and a length (along a lateral direction in FIG. 2A) of the through-hole 25 is shorter than those of the bore 23, so that the optical filter assembly 1 dropped into the bore 23 will not fall out from the through-hole 25 of the metallic base 22.

The filter module 21 is a component constituting an optical subassembly that is an essential part of the optical module. For example, the filter module 21 may be installed in a package of a laser diode to provide an optical subassembly. Herein, since the filter module 21 is provided within the metallic base 22, the laser diode package (metallic package) can be fixed to the metallic base 22 by means of YAG welding. At this time, the metallic base 22 is attached to the laser diode package in a position with a predetermined angle with respect to the laser diode package so as to align an incident light axis or a reflected light axis with an emitted light axis of the laser diode. According to this structure, the optical axis of the laser diode can be easily aligned with a predetermined position in the optical module by incorporating the optical subassembly with a predetermined position in the housing of the optical module.

The reason for providing the through-hole 25 will be explained below referring to FIG. 3.

Figure 3:
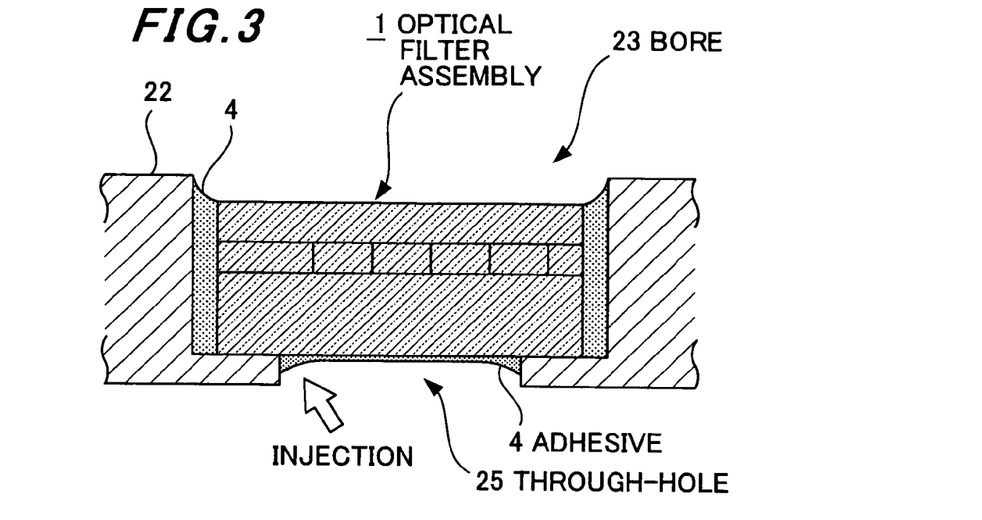
FIG. 3 is a partial cross sectional view of a filter module in a third preferred embodiment according to the invention.

FIG. 3 is a partial cross sectional view of a filter module in the third preferred embodiment according to the invention.

As shown in FIG. 3, there is a gap between the bore 23 and the optical filter assembly 1, and this gap can be filled with the adhesive 4. However, if the adhesive 4 is injected from the upside of FIG. 3, since the bore 23 has a dead end configuration, the bubbles may be pressed by the adhesive 4 and transferred towards the bottom of the bore 23, so that the bubbles may be confined in the adhesive 4.

For solving the above problem, the through-hole 25 is provided at the back side of the metallic base 22. According to this structure, the adhesive 4 can be injected through the through-hole 25 as indicated by an arrow. The adhesive 4 intrudes into a gap between the through-hole 25 and the optical filter assembly 1, and is drawn up between the inner surface of the bore 23 and the side surfaces of the optical filter assembly 1 by the capillarity. At this time, since an upper part of the bore 23 is opened, the bubbles do not remain in the adhesive 4. According to this structure, the metallic base 22 can be fixed securely to the optical filter assembly 1, so that the reliability can be enhanced.

As to regard a curvature of a liquid level of the adhesive 4, the curvature at the gap between the bore 23 and the optical filter assembly 1 is greater than that at an entire opening of the through-hole 25, so that the adhesive 4 injected into the bore 23 is well drawn into the bore 23 by a difference in capillary force.

Further, in the case where the adhesive 4 is injected through the upside into the gap between the bore 23 and the optical filter assembly 1, the adhesive 4 can be drawn down without remaining any bubbles by providing the through-hole 25.

According to this structure, before injecting the adhesive 4, a bottom surface of the optical filter assembly 1 is partially exposed to the outside. After injecting the adhesive 4, the exposed part of the optical filter assembly 1 is covered with the adhesive 4.

Figure 6A:
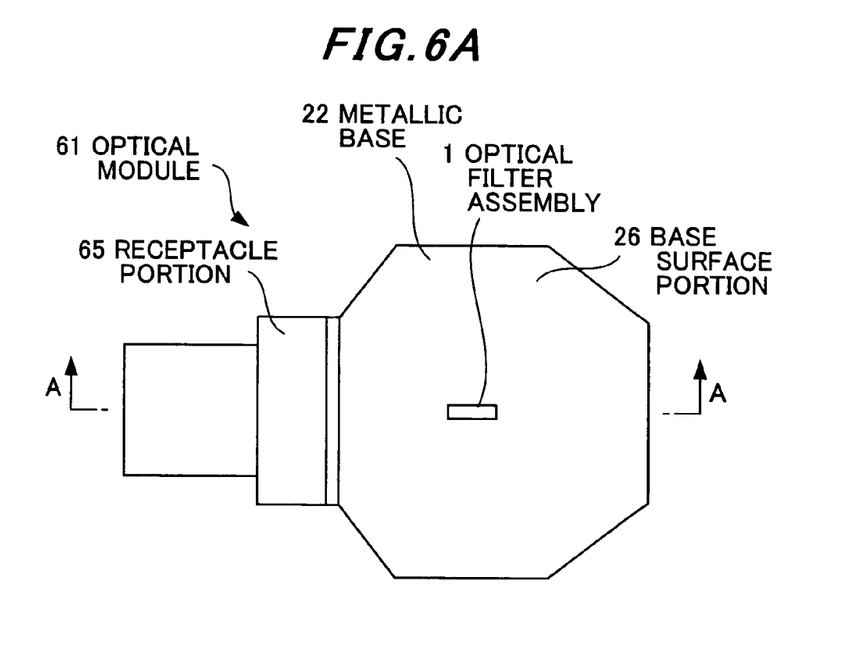
FIG. 6A is a plan view thereof.
Figure 6B:
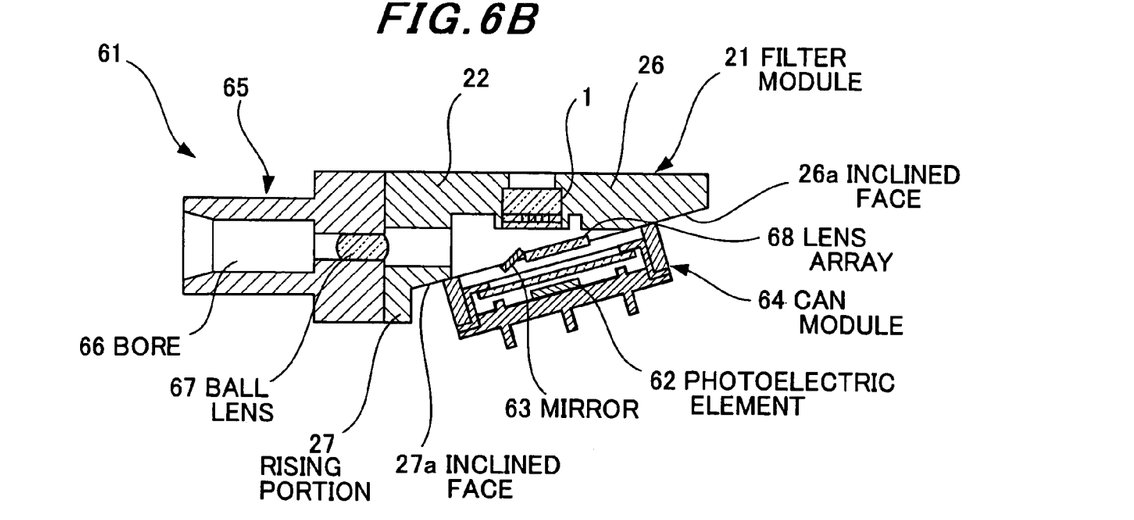

FIGS. 6A and 6B are diagrams showing an optical module in the fourth preferred embodiment according to the invention, wherein FIG. 6A is a plan view thereof, and FIG. 6B is a cross sectional view thereof cut along A-A line in FIG. 6A.

As shown in FIGS. 6A and 6B, in the fourth preferred embodiment according to the present invention, an optical module 61 comprises a receptacle portion 65, a filter module 21, a CAN module 64 for mounting a photoelectric element 62 (e.g. PD array) disposed along with the incident light axis and the emitted light axis of the optical filter assembly 1, the CAN module 64 being fixed to the filter module 21, and a housing (not shown) for receiving the filter module 21 and the CAN module 61.

The configuration of the filter module 21 is described in the first to third preferred embodiment.

The receptacle portion 65 is a metallic member comprising a bore 66 to which an optical connector (not shown) is inserted, and a ball lens 67. The metallic base 22 of the filter module 21 is joined with the receptacle portion 65.

The metallic base 22 of the filter module 21 comprises a lens array 68 for coupling an optical signal with high efficiency to the photoelectric element 62 of the CAN module 64, and a mirror 63 which is inclined and adjacent to the lens array 68. Further, the metallic base 22 and the metal CAN module 64 are fixed to each other by YAG welding. The metallic base 22 of the filter module 21 further comprises a base surface portion 26 for mounting the optical filter assembly 1, which is provided with an inclined face 26a, and a rising portion 27 provided with an inclined face 27a that is positioned in parallel to an extension line of the inclined face 26a.

The CAN module 64 contacts with the inclined face 26a of the base surface portion 26 at one end of its upper surface, and contacts with the inclined face 27a of the rising portion 27 at another end (opposite end) of its upper surface. Therefore, the photoelectric element 62 is inclined with respect to the optical filter assembly 1. On the other hand, the mirror 63 is disposed with a specific angle to reflect the light from the bore 66 and the ball lens 67 to the optical filter assembly 1. According to this structure, the light transmitted from the optical connector accommodated in the receptacle portion 65 is incident on the optical filter assembly 1. The optical paths of the incident light will be understood with reference to the light C shown in FIG. 4A. The demultiplexed lights are respectively focused by the lens array 68 and incident on the photoelectric element 62.

In the fourth preferred embodiment, metallic material is used as the base member of the filter module 21. As the metallic material, it is preferable to use a stainless steel based material such as SUS430, SUS304, and SUS303, that are hard to be rusted. It is more preferable to use SUS430 having a linear expansion coefficient which is close to a linear expansion coefficient of the optical filter assembly 1. In addition, Kovar (Fe54%-Ni29%-Co17% alloy) may be used.

Further, resin material may be used as the base member of the filter module 21. As the resin material, polyetherimide, polycarbonate, or cycloolefin polymer may be used. When the resin material is used as the base member, the CAN module 64 can be bonded to the base member by means of a UV-curing adhesive. By using the resin material as the base member, the base member can be formed integrally with the lens. According to this structure, it is expected that the manufacturing cost can be reduced.

Next, a method for injecting an adhesive from the through-hole will be explained referring to FIGS. 7A to 7C.

Figure 7A:
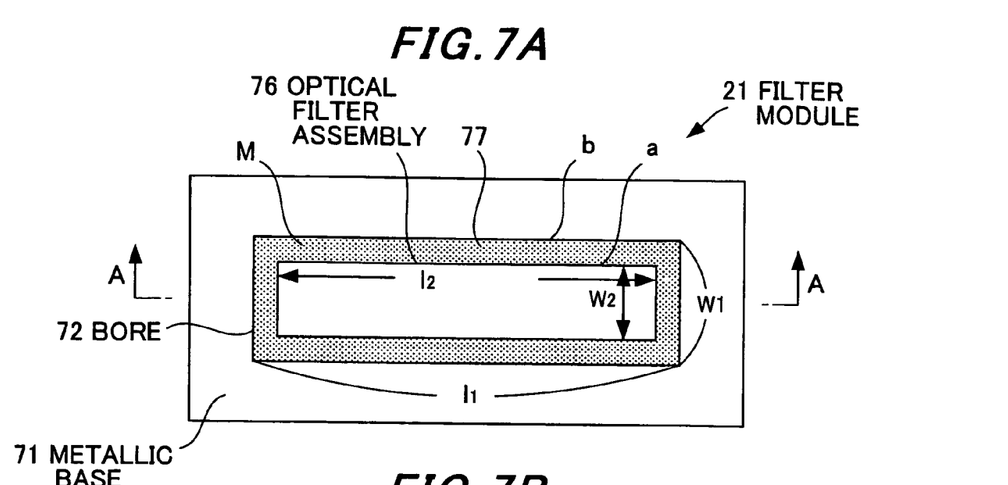
FIG. 7A is a plan view of an optical filter assembly.
Figure 7B:
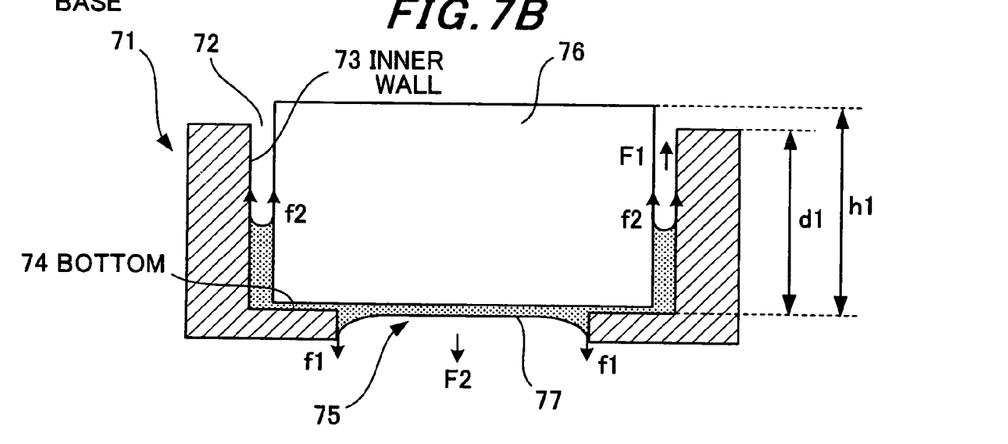
FIG. 7B is a cross sectional view thereof cut along A-A line in FIG. 7A.
Figure 7C:
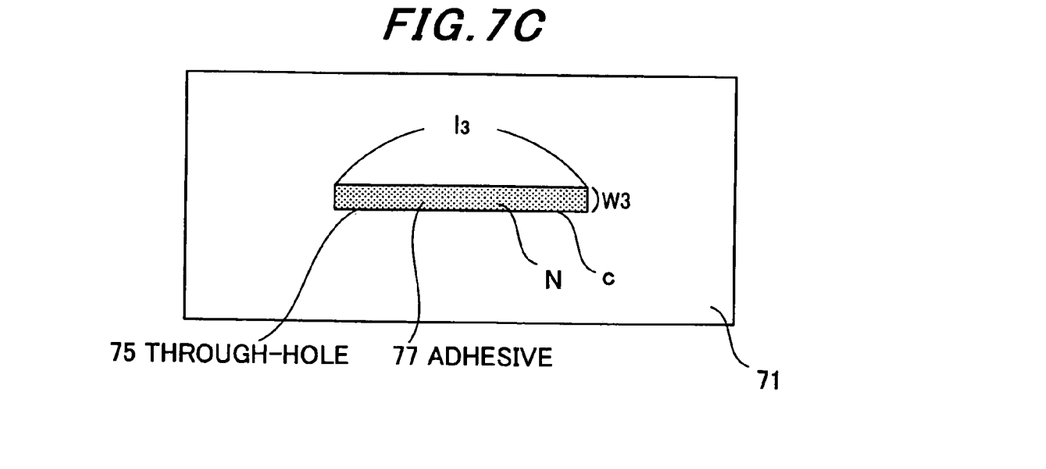
FIG. 7C is a bottom view thereof.

FIGS. 7A to 7C are diagrams showing a method for injecting an adhesive in the invention, wherein FIG. 7A is a plan view of an optical filter assembly, FIG. 7B is a cross sectional view thereof cut along A-A line in FIG. 7A, and FIG. 7C is a bottom view thereof.

As shown in FIGS. 7A to 7C, a filter module 21 comprises a metallic base 71, a bore 72 provided at the metallic base 71, and an optical filter assembly 76, and a space between an inner wall of the bore 72 and a side surfaces of the optical filter assembly 76 is filled with an adhesive 77. For convenience of the explanation, the filter module 21 is illustrated to have a rectangular shape. However, the shape of the filter module 21 is not limited thereto.

The bore 72 has a rectangular opening which is opened to the upside, an inner wall 73 which is perpendicular to an opening plane, and a bottom 74. At a center of the bottom 74, a through-hole 75 is formed to have a rectangular shape which is narrow in width and length than the bottom 74.

The optical filter assembly 76 is a rectangular solid-shaped. When viewed from the upside, an upper surface of the optical filter assembly 76 is a rectangular that is smaller than the opening of the bore 72 and larger than the bottom 74. Further, a height h1 of the optical filter assembly 76 is greater than a depth d1 of the bore 72. Therefore, when the optical filter assembly 76 is disposed on the bottom 74, a top portion of the optical filter assembly 76 is located above an upper surface of the metallic base 71.

According to this structure, before injecting the adhesive 77, a bottom surface of the optical filter assembly 76 is partially exposed to the outside. After injecting the adhesive 77, the exposed part of the optical filter assembly 76 is covered with the adhesive 77. Similarly, a gap between the metallic base 71 and a bottom of the optical filter assembly 76 is filled with the adhesive 77.

The dimensions of the bore 72, the through-hole 75 and the optical filter assembly 76 may be arbitrary determined. In the fourth preferred embodiment, a width w1 and a length l1 of the bore 72 are 1.2 mm and 3.2 mm, respectively, and a width w2 and a length l2 of the optical filter assembly 76 are 1.0 mm and 3.0 mm, respectively. The depth d1 of the bore 72 is 2.0 mm, and the height h1 of the optical filter assembly 76 is 2.2 mm. A width w3 and a length l3 of the through-hole 75 are 1.2 mm and 2.0 mm, respectively. A distance between the inner wall 73 of the bore 72 and the side surface of the optical filter assembly 76 is 0.1 mm in this preferred embodiment. It is preferable that the distance between the inner wall 73 of the bore 72 and the side surface of the optical filter assembly 76 is equal to or less than 0.5 mm so as to utilize the capillarity effect.

Herein, a is an outer periphery length of the optical filter assembly 76 and b is a periphery length of the bore 72 viewed from the upside. A force f1 is a force per unit length functioned by a surface tension between the metallic base 71 and the adhesive 77 and a force f2 is a force per unit length functioned by a surface tension between the optical filter assembly 76 and the adhesive 77, when the liquid-type adhesive 77 is injected through the through-hole 75 and flown into the gap between the optical filter assembly 76 and the bore 72 by the capillarity. A force F1 of the adhesive 77 for rising in the gap between the bore 72 and the optical filter assembly 76 is expressed as:

$$F1 = f1 \times b + f2 \times a.$$

On the other hand, a force F2 of the adhesive 77 for descending into the through-hole 75 is expressed as:

$$F2 = f1 \times c$$

wherein c is a periphery length of the through-hole 75.
Accordingly,
if the "b>c" (1) is established, $$F1>F2.$$

In addition, when M is an area of the gap between the bore 72 and the optical filter assembly 76, wherein M can be calculated by subtracting "an upper surface area of the optical filter assembly 76" from "an upper surface area of the bore 72", and N is an area of the through-hole 75,
if the "M<N" (2) is established, $$F1/M > F2/N. \qquad (3)$$

According to the Pascal's principle, the adhesive 77 moves from the through-hole 75 to the gap between the bore 72 and the optical filter assembly 76.

In conclusion, when the inequality (1) and the inequality (2) are satisfied, the inequality (3) is established, so that the adhesive 77 moves from the through-hole 75 to the gap between the bore 72 and the optical filter assembly 76. In addition, if the inequality (1) is satisfied, "f2×a>0" will be established, so that F1>F2 will be established. Therefore, as far as "b>c" is satisfied, it is not necessary to consider about "f2×a". Therefore, "f2" and "a" are not mentioned here.

The adhesive 77 used in the fourth preferred embodiment is acrylic resin, and a viscosity thereof is 440 cp. As the adhesive 77, epoxy system resin, silicon system resin or the like may be used. As for the working temperature, 20 to 40° C. is preferable.

A meniscus (an interface with the air of the adhesive 77) shown in FIG. 7B is a meniscus of the adhesive 77 during the migration (displacement). At this state, since "F1>F2" is established, the adhesive 77 continues to migrate to the upside. The force f1 per unit length functioned by the surface tension between the metallic base 71 and the adhesive 77 is directed right above, namely the force f1 does not have a horizontal component. Similarly, the force f2 per unit length functioned by the surface tension between the optical filter assembly 76 and the adhesive 77 is directed right above, namely the force f2 does not have a horizontal component.

Figure 8:
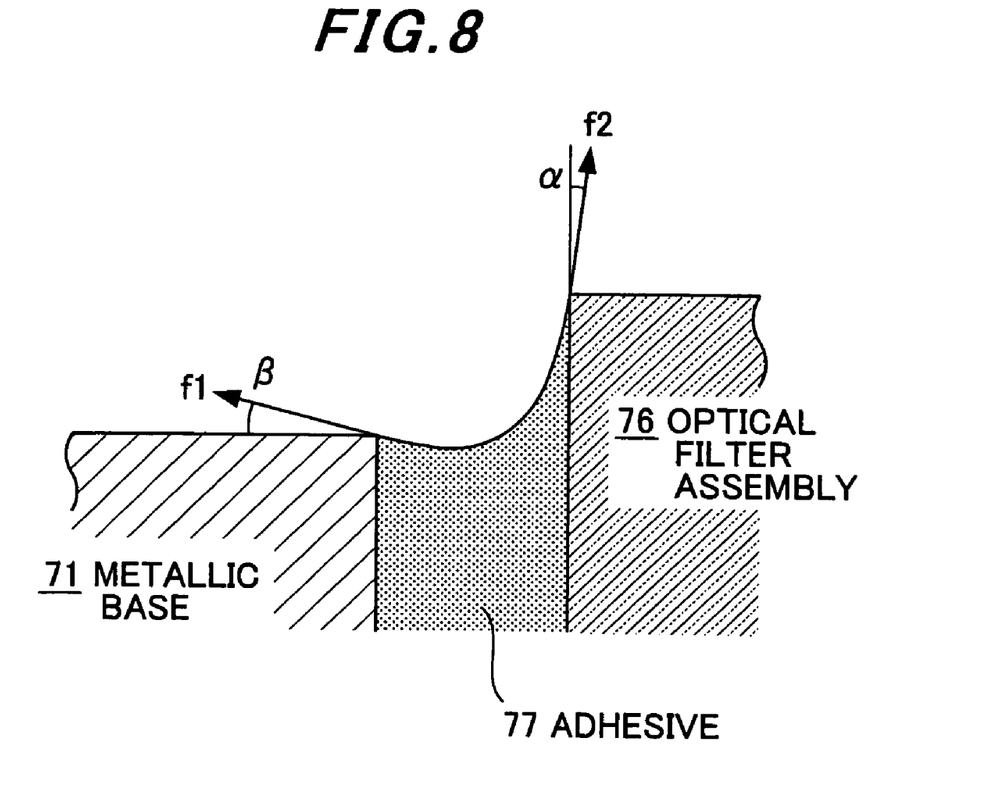
FIG. 8 is a schematic diagram showing an enlarged cross section of an optical filter assembly in the present invention.

FIG. 8 is a schematic diagram showing a schematic enlarged cross section of an optical filter assembly in the present invention.

A meniscus shown in FIG. 8 is a meniscus when the adhesive 77 is moved to the uppermost. At this state, the force f1 and the force f2 have a horizontal component of cost and a horizontal component of cos β, respectively. Therefore, the upper direction components of the force f1 and the force f2 are smaller than those shown in FIG. 7B. As a result, the condition of "F1≈F2" is established, so that the migration of the adhesive 77 is stopped and the meniscus is stabilized as shown in FIG. 8.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:
1. A filter module comprising:
an optical filter assembly, comprising:
a multilayer filter;
a transparent member bonded to said multilayer filter; and
a bonding surface provided between said transparent member and said multilayer filter, said bonding surface bonding said transparent member to said multilayer filter;
a metallic base comprising a bore for receiving the optical filter assembly; and
an adhesive that fills a gap between the bore and the optical filter assembly and covers edges of the multilayer filter and edges of the transparent member at the bonding surface completely.
2. A filter module, according to claim 1, wherein the metallic base further comprises a through-hole that passes through the metallic base.
3. The filter module, according to claim 2, wherein the through-hole passes from a bottom of the bore to a back surface of the metallic base.
4. The filter module, according to claim 2, wherein the adhesive is provided in the through-hole.
5. The filter module, according to claim 4, wherein the adhesive covers an exposed part of a bottom surface of the optical filter assembly.
6. The filter module, according to claim 4, wherein a curvature of a liquid level of the adhesive at the gap between the bore and the optical filter assembly is greater than that of the adhesive provided in the through-hole.
7. The filter module, according to claim 2, wherein the adhesive fills a gap between a bottom surface of the optical filter assembly and the metallic base.
8. The filter module, according to claim 2, wherein b>c is satisfied where b comprises a periphery length of the bore and c comprises a periphery length of the through-hole.
9. The filter module, according to claim 2, wherein M<N is satisfied where M comprises an area of the gap between the bore and the optical filter assembly and N comprises an area of the through-hole.
10. The filter module, according to claim 1, wherein the adhesive fills a space between an inner wall of the bore and side surfaces of the optical filter assembly.
11. The filter module, according to claim 1, wherein said bonding surface has edges exposed to side surfaces of said optical filter assembly, and
wherein said adhesive completely covers said edges of the bonding surface.
12. The filter module, according to claim 11, wherein said multilayer filter has edges exposed to said side surfaces of said optical filter assembly,
wherein said transparent member has edges exposed to said side surfaces of said optical filter assembly, and
wherein said adhesive completely covers said edges of said multilayer filter and said transparent member.
13. An optical module, comprising:
a filter module comprising:
an optical filter assembly comprising:
a multilayer filter,
a transparent member bonded to said multilayer filter; and
a bonding surface provided between said transparent member and said multilayer filter, said bonding surface bonding said transparent member to said multilayer filter;
a metallic base including a bore for receiving the optical filter assembly; and
an adhesive that fills a gap between the bore and the optical filter assembly and covers edges of the multilayer filter and edges of the transparent member at the bonding surface completely; and a CAN module comprising a photoelectric element disposed along an incident and emitted light axis of the optical filter assembly, the CAN module being fixed to the filter module.

14. The optical module, according to claim 13, wherein the metallic base further comprises a through-hole that passes through the metallic base, and
    wherein a curvature of a liquid level of the adhesive at the gap between the bore and the optical filter assembly is greater than a curvature of a liquid level of the adhesive provided in the through-hole.

15. A method of fabricating a filter module, comprising:
    forming an optical filter assembly, comprising bonding a multilayer filter to a transparent member through a bonding surface provided between said transparent member and said multilayer filter;
    dropping the optical filter assembly into a bore formed at a metallic base; and
    filling an adhesive into a gap between the bore and the optical filter assembly to cover edges of the multilayer filter and edges of the transparent member at a said bonding surface between the multilayer filter and the transparent member completely.

16. The method of fabricating a filter module, according to claim 15, wherein the adhesive is injected through the through-hole.

17. The method of fabricating a filter module, according to claim 15, wherein the adhesive is injected through the gap between the bore and the optical filter assembly.

18. The method of fabricating the filter module, according to claim 15, wherein the metallic base further comprises a through-hole that passes through the metallic base, and wherein a curvature of a liquid level of the adhesive at the gap between the bore and the optical filter assembly is greater than a curvature of a liquid level of the adhesive provided in the through-hole.

19. A filter module comprising:
    an optical filter assembly comprising a multilayer filter bonded to a transparent member at a bonding surface;
    a metallic base comprising a bore for receiving the optical filter assembly; and
    an adhesive that fills a gap between the bore and the optical filter assembly and covers edges of the bonding surface completely,
    wherein the metallic base further comprises a through-hole that passes through the metallic base, and
    wherein a curvature of a liquid level of the adhesive at the gap between the bore and the optical filter assembly is greater than a curvature of a liquid level of the adhesive provided in the through-hole.

20. The filter module according to claim 19, wherein the adhesive fills a space between an inner wall of the bore and side surfaces of the optical filter assembly.

21. The filter module according to claim 19, wherein the through hole passes from a bottom of the bore to a back surface of the metallic base.

22. The filter module according to claim 19, wherein the adhesive covers an exposed part of a bottom surface of the optical filter assembly.

* * * * *